United States Patent
Sorrentino et al.

(10) Patent No.: US 10,201,025 B2
(45) Date of Patent: Feb. 5, 2019

(54) CARRIER SELECTION FOR DEVICE-TO-DEVICE MEASUREMENTS

(71) Applicant: Telefonaktiebolaget LM Ericsson (publ), Stockholm (SE)

(72) Inventors: Stefano Sorrentino, Solna (SE); Muhammad Kazmi, Bromma (SE); Santhan Thangarasa, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/516,812

(22) PCT Filed: Oct. 5, 2015

(86) PCT No.: PCT/SE2015/051049
§ 371 (c)(1),
(2) Date: Apr. 4, 2017

(87) PCT Pub. No.: WO2016/056979
PCT Pub. Date: Apr. 14, 2016

(65) Prior Publication Data
US 2017/0295585 A1    Oct. 12, 2017

Related U.S. Application Data

(60) Provisional application No. 62/060,372, filed on Oct. 6, 2014.

(51) Int. Cl.
*H04L 12/26* (2006.01)
*H04W 76/10* (2018.01)
(Continued)

(52) U.S. Cl.
CPC ............. *H04W 76/10* (2018.02); *H04L 5/001* (2013.01); *H04L 5/006* (2013.01); *H04L 5/008* (2013.01);
(Continued)

(58) Field of Classification Search
CPC .................. H04L 5/0048; H04W 24/08; H04W 72/0406; H04W 72/085; H04W 8/005

See application file for complete search history.

(56) References Cited

U.S. PATENT DOCUMENTS

2012/0258706 A1* 10/2012 Yu ................ H04W 56/002
  455/426.1
2013/0308490 A1  11/2013 Lim et al.
2014/0315562 A1* 10/2014 Lim ................ H04W 8/005
  455/450

FOREIGN PATENT DOCUMENTS

CN    103582077    2/2014
EP    2975792 A1   1/2016
(Continued)

OTHER PUBLICATIONS

3GPP TSG RAN WG1 Meeting #80bis; Belgrade, Serbia; Source: LG Electronics; Title: On supporting discovery in a carrier other than PCell (R1-151507)—Apr. 20-24, 2015.
(Continued)

*Primary Examiner* — Minh Trang T Nguyen
(74) *Attorney, Agent, or Firm* — Sage Patent Group

(57) ABSTRACT

According to some embodiments, a method in a wireless device configured to use a first cell for wireless access network (WAN) operation comprises receiving, from a network node, an identification of a second cell that the wireless device may use for device-to-device (D2D) operation. The wireless device determines a reference cell associated with an uplink carrier used for D2D operation in the second cell. The method further comprises measuring a downlink reference signal of the reference cell, and performing one or more tasks related to D2D communication on the uplink carrier based on the measurement of the downlink reference signal.

33 Claims, 6 Drawing Sheets

(51) Int. Cl.
| | |
|---|---|
| *H04L 5/00* | (2006.01) |
| *H04L 5/14* | (2006.01) |
| *H04W 8/00* | (2009.01) |
| *H04W 24/08* | (2009.01) |
| *H04W 72/04* | (2009.01) |
| *H04W 72/08* | (2009.01) |
| *H04W 52/38* | (2009.01) |
| *H04L 5/16* | (2006.01) |

(52) U.S. Cl.
CPC .......... *H04L 5/0032* (2013.01); *H04L 5/0048* (2013.01); *H04L 5/0073* (2013.01); *H04L 5/0098* (2013.01); *H04L 5/14* (2013.01); *H04W 8/005* (2013.01); *H04W 24/08* (2013.01); *H04W 52/383* (2013.01); *H04W 72/0406* (2013.01); *H04W 72/085* (2013.01); *H04L 5/0023* (2013.01); *H04L 5/1438* (2013.01); *H04L 5/16* (2013.01)

(56) References Cited

FOREIGN PATENT DOCUMENTS

| WO | WO 2013 062351 | 5/2013 |
|---|---|---|
| WO | WO 2014 142505 | 9/2014 |
| WO | WO 2016024906 A1 | 2/2016 |

OTHER PUBLICATIONS

International Search Report for International application No. PCT/SE2015/051049—dated Feb. 1, 2016.

3GPP TSG RAN WG1 Meeting #76; Prague, Czech Republic; Source: Intel Corporation; Title: On Support of Inter-cell D2D Discovery (R1-140135)—Feb. 10-14, 2014.

Nokia et al: "D2D synchronization—with network cove", 3GPP Draft; R1-134537, Sep. 28, 2013 3rd Generation Partnership Project (3GPP), Mobile Competence Centre; 650, Route Des Lucioles; F-06921 Sophia-Antipolis Cedex; France, vol. RAN WG1, No. Guangzhou, China; Oct. 7, 2013-Oct. 11, 2013, Sep. 28, 2013, XP050717640 URL: http://www.3gpp.org/ftp/tsg_ran/WG1_RL1/TSGR1_74b/Docs/.

Ericsson: "Inter-Carrier Aspects of D2D Discovery and Communication", 3GPP Draft; R1-144320 Inter-Carrier D2D, 3rd Generation Partnership Project (3GPP), Mobile Competence Centre; 650, Route Des Lucioles; F-06921 Sophia-Antipolis Cedex; France, vol. RAN WG1, no. Ljubljana, Slovenia; Oct. 6, 2014-Oct. 10, 2014, Oct. 5, 2014, XP050875575, URL: http://www.3gpp.org/ftp/meetings_3GPP_SYNC/RAN1/Docs.

Suppliementary European Search Report—EP 15849260—dated May 8, 2018—3 pages.

* cited by examiner

CARRIER SELECTION FOR DEVICE-TO-DEVICE MEASUREMENTS

PRIORITY

This nonprovisional application is a U.S. National Stage Filing under 35 U.S.C. § 371 of International Patent Application Serial No. PCT/SE2015/051049 filed Oct. 5, 2015, and entitled "Carrier Selection For Device-To-Device Measurements" which claims priority to U.S. Provisional Patent Application No. 62/060,372 filed Oct. 6, 2014, both of which are hereby incorporated by reference in their entirety.

TECHNICAL FIELD

Particular embodiments relate generally to device-to-device (D2D) communication in wireless communications networks, and more particularly to selecting a carrier for measuring reference signals for use in D2D communication.

BACKGROUND

Device-to-device communication (D2D) is a component of existing wireless technologies, including ad hoc and cellular networks. Examples include Bluetooth and several variants of the IEEE 802.11 standards suite such as WiFi Direct. These systems typically operate in unlicensed spectrum. D2D communications may also operate as an underlay to cellular networks as a means to take advantage of the proximity of communicating devices and at the same time to allow devices to operate in a controlled interference environment. Such device-to-device communication may share the same spectrum as the cellular system by, for example, reserving some of the cellular uplink resources for device-to-device purposes. Allocating dedicated spectrum for device-to-device purposes, however, is not a desirable solution as spectrum is a scarce resource. Dynamic spectrum sharing between the device-to-device services and cellular services provides flexibility and higher spectrum efficiency.

D2D communication may offer a variety of services to peer devices. Some non-limiting examples of such services include public safety and disaster relief (also known as national security and public safety (NSPS)), relaying function for coverage extension, proximity based social networking, cooperative positioning, and so on. D2D applications may include direct discovery and direct communication. In both cases, a transmitter sends D2D signals that are directly received at least by the intended receivers. D2D devices may operate in multi-carrier scenarios where cellular and/or D2D is configured to operate on multiple carriers. Such carriers do not necessarily belong to a single operator and are not necessarily coordinated and synchronized. D2D devices may operate on a carrier that is not the carrier of the device's serving cell.

D2D communication may refer to direct communication between devices. D2D devices operate within a radio access network. In cellular network assisted device-to-device communications (also called D2D communications as a cellular underlay), user equipment (UE) in the vicinity of each other can establish a direct radio link (D2D bearer). While UEs communicate over the D2D "direct" bearer, they also maintain a cellular connection with their respective serving base station (eNB).

In this way the cellular radio access network (RAN) can assist and supervise the UEs in allocating time, frequency, and code resources for the D2D bearer. Also, the cellular network may determine whether the D2D pair should use the direct link or communication should take place via the eNB. The network may also set the maximum power level that the D2D pair may use for the D2D bearer. Thus, network assisted D2D communications may take advantage of the short distances between devices and reuse cellular spectrum while at the same time protecting the cellular layer from potentially harmful interference caused by the D2D link.

D2D communication may support two different operational modes. In the first mode, the location of the resources for transmission of the scheduling assignment by the broadcasting UE comes from the eNodeB. The location of the resource(s) for transmission of the D2D data by the broadcasting UE comes from the eNodeB. In the second mode, a resource pool for scheduling assignment is pre-configured and/or semi-statically allocated. The UE selects a resource for scheduling assignment from the resource pool.

D2D communication may operate in multicarrier or carrier aggregation (CA) networks. In multicarrier or carrier aggregation networks, the UE is able to receive and/or transmit data to more than one serving cell (i.e., a CA capable UE may operate with more than one serving cell).

The carrier of each serving cell may be referred to as a component carrier (CC). A component carrier generally refers to an individual carrier in a multi-carrier system. Carrier aggregation may also be referred to as "multi-carrier system", "multi-cell operation", "multi-carrier operation", or "multi-carrier" transmission and/or reception.

Carrier aggregation may transmit signaling and data in both the uplink (UL) and downlink (DL) directions. One of the component carriers is the primary component carrier (PCC) (also referred to as primary carrier or anchor carrier). The remaining carriers are called secondary component carriers (SCC) (also referred to as secondary carriers or supplementary carriers). The serving cell may be interchangeably referred to as primary cell (PCell) or primary serving cell (PSC). Similarly, the secondary serving cell may be interchangeably referred to the as secondary cell (SCell) or secondary serving cell (SSC).

Generally, the primary or anchor component carrier carries the essential UE specific signaling. In carrier aggregation, the primary component carrier (e.g., PCC or PCell) exists in both uplink and downlink directions. In a scenario with a single uplink component carrier, the single uplink is the PCell. The network may assign different primary carriers to different UEs operating in the same sector or cell.

The serving radio network node (e.g., eNodeB in LTE) may use a configuration procedure to configure a carrier aggregation UE with one or more SCells (DL SCell, UL SCell, or both). The eNodeB may use a de-configuration procedure to de-configure or remove one or more already configured SCells (DL SCell, UL SCell, or both). The configuration or de-configuration procedure may also be used to change the current multi-carrier configuration (e.g., for increasing or decreasing the number of SCells or for swapping the existing SCells with new ones).

D2D UEs transmit D2D signals or channels in the uplink part of the spectrum. A D2D UE may operate in a half-duplex mode (i.e., the UE can either transmit D2D signals/channels or receive D2D signals/channels). D2D relay UEs may relay some signals to other D2D UEs. D2D signals may include control information, some of which is transmitted by D2D UEs and some of which is transmitted by eNodeBs (e.g., D2D resource grants for D2D communication may be transmitted via cellular downlink control channels). D2D transmissions may occur on resources which are configured by the network or selected autonomously by the D2D UE.

D2D communication refers to transmitting, by a D2D transmitter, D2D data and D2D control information with scheduling assignments (SAs) to assist D2D receivers of the D2D data. D2D data may be transmitted according to configured patterns and may be transmitted relatively frequently. Scheduling assignments may be transmitted periodically. In some examples of operation, D2D transmitters that are within the network coverage may request eNodeB resources for their D2D communication transmissions and receive in response D2D resource grants for scheduling assignments and D2D data. In other examples of operation, an eNodeB may broadcast D2D resource pools for D2D communication.

D2D discovery messages may be transmitted in relatively infrequent periodic subframes. An eNodeB may broadcast D2D resource pools for D2D discovery, both for reception and transmission.

Power control is a consideration for D2D communication. In LTE, uplink power control is specified. An objective is to control the UE transmit power of different uplink physical channels including PUSCH and PUCCH.

According to third generation partnership project (3GPP) TS 36.213 v12.2.0, the setting of the UE Transmit power for a Physical Uplink Shared Channel (PUSCH) transmission may be defined as follows.

If a UE transmits PUSCH without a simultaneous PUCCH for the serving cell c, then the UE transmit power $P_{PUSCH,c}$ (i) for PUSCH transmission in subframe i for the serving cell c is given by $$P_{PUSCH,c}(i) = \min\begin{Bmatrix} P_{CMAX,c}(i) \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$

If a UE transmits PUSCH simultaneous with PUCCH for the serving cell c, then the UE transmit power $P_{PUSCH,c}$ (i) for the PUSCH transmission in subframe i for the serving cell c is given by $$P_{PUSCH,c}(i) = \min\begin{Bmatrix} 10\log_{10}(\hat{P}_{CMAX,c}(i) - \hat{P}_{PUCCH}(i)), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}[dBm]$$

To enable uplink power control operation, a UE may be configured with one or more parameters. For example, the UE may derive path loss (PL) in the above expressions based on CRS power and RSRP measurement on a serving cell in which it operates. As a particular example, according to TS 36.213 v12.2.0, $PL_c$ is the downlink path loss estimate calculated in the UE for serving cell c in dB and $PL_c$=referenceSignalPower is the higher layer filtered RSRP, where referenceSignalPower is provided by higher layers and RSRP is measured by the UE on the downlink CRS signals of a serving cell for which uplink power control is performed by the UE.

A carrier aggregation UE may independently perform power control in each serving cell (i.e., PCell and SCell(s)) for different control channels. Path loss may be derived based on RSRP and referenceSignalPower of the downlink serving cell (i.e. DL CC) which is linked to an uplink serving cell (i.e. UL CC) for which the power control is performed. The linkage between the downlink and uplink carriers may be signaled to the UE by a higher layer.

A D2D UE configured on an uplink carrier may perform certain measurements on downlink signals on the corresponding downlink carrier (i.e., on DL of the serving cell of the UE). The D2D UE may use these measurements for radio operations at least partly related to D2D operation. For example, such radio operations may include: deriving path loss for power control or for transmitting signals on D2D links with certain power; UE transmit timing adjustment of D2D signals; and estimation of signal strength or signal quality with respect to a network node.

Typically, D2D operation is configured on one of the serving carriers of the UE (e.g., on UL PCell in single carrier or UL SCell in carrier aggregation). On a serving carrier, the UE is configured for at least wireless access network operation (i.e., cellular operation, or non-D2D operation). In this configuration, a UE can perform downlink measurements needed for D2D operation on the downlink of the serving cell.

However, a D2D UE operating in single carrier operation for a wireless access network may also be configured for D2D operation on a carrier which is different from the serving carrier of the UE. Similarly, the D2D UE operating in carrier aggregation mode for a wireless access network may also be configured for D2D operation on a carrier which is different than any of the serving carriers of the UE. In these scenarios, there is no downlink cell or carrier associated with the uplink cell or carrier on which the D2D UE can perform downlink radio measurements.

Thus, the UE behavior in terms of how to perform downlink measurements for D2D operation is unspecified and undefined. Therefore, in such a scenario, the D2D operation either cannot be performed or it may significantly degrade the system performance. For example, because of a lack of path loss measurement with respect to the downlink cell that should be linked to the uplink cell on which D2D operation is configured, the UE may transmit at full output power. This may cause interference in the uplink at the receiver of the radio network nodes (e.g., neighboring base stations).

SUMMARY

According to some embodiments, a method in a wireless device configured to use a first cell for wireless access network (WAN) operation comprises receiving, from a network node, an identification of a second cell that the wireless device may use for device-to-device (D2D) operation. The wireless device determines a reference cell associated with an uplink carrier used for D2D operation in the second cell. The wireless device measures a downlink reference signal of the reference cell. The wireless device performs one or more tasks related to D2D communication on the uplink carrier based on the measurement of the downlink reference signal.

In particular embodiments, determining the reference cell comprises receiving, from the network node, an identification of the reference cell. The identification of the reference cell may comprise an identification of the first cell or the second cell.

The method may include receiving the identification of the reference cell from the network node or determining an identification of the reference cell using at least one pre-defined rule.

In particular embodiments, the pre-defined rule comprises: determining the second cell does not include a downlink reference signal; determining a carrier of the first cell belongs to the same frequency band as the uplink carrier used for D2D operation in the second cell; and identifying the first cell.

In particular embodiments, the pre-defined rule comprises: determining the second cell does not include a downlink reference signal; determining the first cell comprises a carrier aggregation primary cell; determining the wireless device is associated with a third cell, the third cell comprising a carrier aggregation secondary cell; determining that a carrier of one of the first cell or the second cell belongs to the same frequency band as the uplink carrier used for D2D operation in the second cell; and identifying the second cell. Determining that a carrier belongs to the same frequency band as the uplink carrier used for D2D operation in the second cell may comprise determining the carrier belongs to a frequency band within a pre-defined range of the frequency band of the uplink carrier used for D2D operation in the second cell.

In particular embodiments, the method further comprises applying an offset to the at least one measurement on the downlink reference signal. The offset may be received from the network node or the offset may be determined based on at least one pre-defined rule.

In particular embodiments, the method further comprises determining a signal quality of the downlink reference signal is below a threshold. In particular embodiments, the method further comprises disabling power control on the uplink carrier used for D2D operation in the second cell. In particular embodiments, the method further comprises modifying a resource allocation mode for the uplink carrier used for D2D operation in the second cell. In particular embodiments, the method further comprises determining another reference cell associated with the uplink carrier used for D2D operation in the second cell.

In particular embodiments, performing one or more tasks related to D2D communication on the uplink carrier comprises performing any one of data communication, discovery, synchronization, and power control.

According to some embodiments, a method in a network node comprises communicating, to a wireless device configured to use a first cell for WAN operation and operable to perform device-to-device (D2D) communication, an identification of a second cell that the wireless device may use for D2D operation. The network node determines a reference cell associated with an uplink carrier used for D2D operation in the second cell. The network node communicates, to the wireless device, an identification of the reference cell.

In particular embodiments, the method further comprises receiving an indication that a signal quality of a downlink reference signal is below a threshold. The method may further comprise determining another reference cell associated with an uplink carrier used for D2D operation in the second cell.

In particular embodiments, the method further comprises communicating, to the wireless device, an offset that the wireless device is to apply to at least one measurement on a downlink reference signal.

According to some embodiments, a wireless device configured to use a first cell for WAN operation comprises a processor operable to receive, from a network node, an identification of a second cell that the wireless device may use for D2D operation. The wireless device is operable to determine a reference cell associated with an uplink carrier used for D2D operation in the second cell. The wireless device is further operable to measure at least one property of a downlink reference signal of the reference cell and perform one or more tasks related to D2D communication on the uplink carrier based on the measurement on the downlink reference signal.

According to some embodiments, a network node comprises a processor operable to communicate, to a wireless device configured to use a first cell for wireless access network (WAN) operation and operable to perform D2D communication, an identification of a second cell that the wireless device may use for D2D operation. The network node is also operable to determine a reference cell associated with an uplink carrier used for D2D operation in the second cell and communicate, to the wireless device, an identification of the reference cell.

According to some embodiments, a wireless device configured to use a first cell for wireless access network (WAN) operation comprises a receiving module, a determining module, a measuring module, and a D2D communications module. The receiving module receives, from a network node, an identification of a second cell that the wireless device may use for D2D operation. The determining module determines a reference cell associated with an uplink carrier used for D2D operation in the second cell. The measuring module measures at least one property of a downlink reference signal of the reference cell. The D2D communications module performs one or more tasks related to D2D communication on the uplink carrier based on the measurement on the downlink reference signal.

According to some embodiments, a network node comprises a communications module and a determining module. The communications module communicates, to a wireless device configured to use a first cell for wireless access network (WAN) operation and operable to perform D2D communication, an identification of a second cell that the wireless device may use for D2D operation. The determining module determines a reference cell associated with an uplink carrier used for D2D operation in the second cell. The communications module communicates, to the wireless device, an identification of the reference cell.

Also disclosed is a computer program product. The computer program product comprises instructions stored on non-transient computer-readable media which, when executed by a processor, perform the acts of receiving, at a wireless device configured to use a first cell for WAN operation, an identification of a second cell that the wireless device may use for device-to-device (D2D) operation. The instructions, when executed by the processor, determine a reference cell associated with an uplink carrier used for D2D operation in the second cell. The instructions, when executed by the processor, measure a downlink reference signal of the reference cell and perform one or more tasks related to D2D communication on the uplink carrier based on the measurement of the downlink reference signal.

Another computer program product comprises instructions stored on non-transient computer-readable media which, when executed by a processor, perform the acts of communicating, to a wireless device configured to use a first cell for wireless access network (WAN) operation and operable to perform device-to-device (D2D) communication, an identification of a second cell that the wireless device may use for D2D operation. The instructions, when executed by the processor, determine a reference cell associated with an uplink carrier used for D2D operation in the second cell and communicate, to the wireless device, an identification of the reference cell.

Particular embodiments may exhibit some of the following technical advantages. In some embodiments, rules and procedures enable a D2D wireless device to perform one or more downlink signal measurements (e.g., path loss) for D2D related operations (e.g., UL power control on D2D carrier) when the D2D operation is performed on a carrier frequency that is different than the carrier of any of the serving cells of the wireless device for WAN operation (e.g., neither PCell nor SCell). For example, a wireless device is traditionally able to measure downlink signals that it receives in its PCell or SCell and use those measurements to determine transmission parameters for uplink transmissions in its PCell or SCell. When a wireless device performs D2D communication on a carrier that is not part of either its PCell or SCell, there is no corresponding downlink carrier for the wireless device to measure for determining transmission parameters for uplink transmission on the D2D carrier. Particular embodiments facilitate a wireless device determining a reference cell corresponding to the D2D carrier and measuring a reference signal in the reference cell to determine transmission parameters for uplink transmission on the D2D carrier. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

As described above, a D2D wireless device may be configured for D2D operation on a carrier which is different from the serving carrier of the wireless device, or a D2D wireless device operating in carrier aggregation mode may be configured for D2D operation on a carrier which is different than any of the serving carriers of the wireless device. In these scenarios, the wireless device cannot perform downlink measurements for D2D operation because there is no downlink cell or carrier associated with the uplink cell or carrier.

An object of the present disclosure is to obviate at least these disadvantages and provide rules and procedures that facilitate a D2D wireless device to perform one or more downlink signal measurements for D2D related operations when the D2D operation is performed on a carrier frequency that is different than the carrier of any of the serving cells that the wireless device uses for WAN operation (e.g., neither PCell nor SCell).

Particular embodiments are described with reference to FIGS. 1-6B of the drawings, like numerals being used for like and corresponding parts of the various drawings. LTE is used throughout this disclosure as an example cellular system, but the ideas presented herein apply to other wireless communication systems as well.

Figure 1:
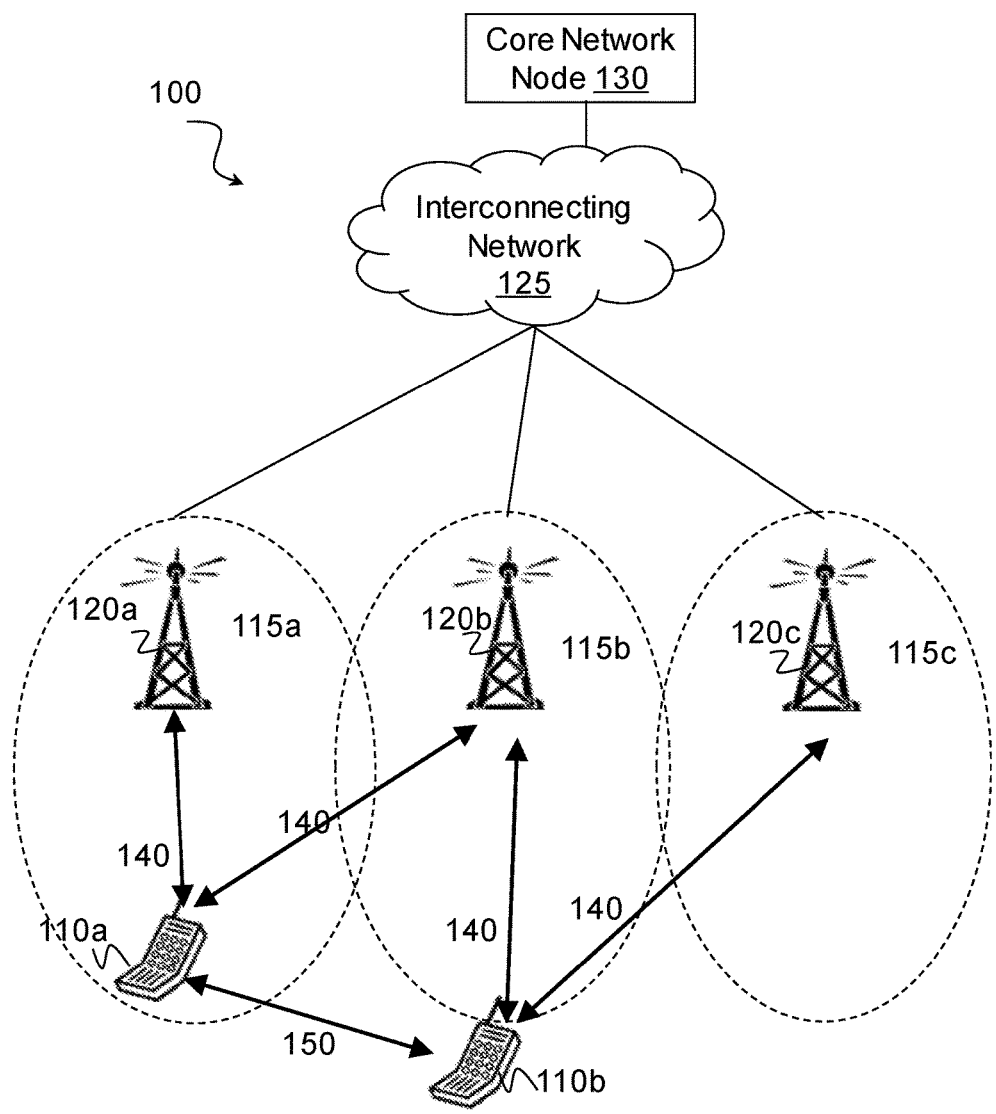
FIG. 1 is a block diagram illustrating an example wireless network, according to a particular embodiment.

FIG. 1 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of radio network nodes. The network nodes include network nodes 120 (such as base stations or eNodeBs), and a core network node 130. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 140. For example, wireless devices 110 and radio network node 120 may communicate wireless signals 140 containing voice traffic, data traffic, and/or control signals. A network node 120 communicating voice traffic, data traffic, and/or control signals to wireless device 110 may be referred to as a serving network node 120 for the wireless device 110.

Wireless signals 140 may include both downlink transmissions (from radio network node 120 to wireless devices 110) and uplink transmissions (from wireless devices 110 to radio network node 120). Wireless signals 140 may include broadcast information such as system information (transmitted in system information blocks (SIGs)). Wireless signals 140 may include reference signals. Wireless device 110 may detect reference signals to perform channel estimation, data demodulation, power control, etc.

In particular embodiments, wireless device 110 may measure downlink reference signals and use the measurements to make decisions about uplink transmission. For example, wireless device 110a may measure cell-specific reference signals (CRS) to determine reference signal received power (RSRP) or reference signal received quality (RSRQ) in the downlink from serving cell 120a. Wireless device 110a may assume the uplink to serving cell 120a shares similar characteristics as the downlink. Wireless device 110a may use the downlink measurements to calculate an uplink transmit power.

Particular embodiments are applicable to single carrier, to multicarrier, or to carrier aggregation systems. As an example of carrier aggregation, network node 120a may be the network node of the primary serving cell for wireless device 110a and network node 120b may be the network node of the secondary serving cell for wireless device 110a. The primary serving cell and secondary serving cell may operate with different carrier frequencies. Wireless device 110a may measure downlink reference signals from network node 120a to determine uplink transmission parameters for network node 120a. Similarly, wireless device 110a may measure downlink reference signals from network node 120b to determine uplink transmission parameters for network node 120b.

Wireless devices 110 may communicate with each other (i.e., D2D operation) by transmitting and receiving wireless signals 150. For example, wireless device 110a may communicate with wireless device 110b using wireless signal 150. In particular embodiments, wireless signal 150 may use a different carrier frequency than the carrier frequency of wireless signal 140. For example, wireless device 110a may communicate with network node 120a using a first frequency band. Wireless device 110b may communicate with network node 120b using a second frequency band. Wireless device 110a may communicate with wireless device 110b using a carrier in the first frequency band, the second frequency band, or any other suitable frequency band available to wireless devices 110a and 110b.

Core network node 130 manages the establishment of communication sessions and various other functionality for wireless communication devices 110 within coverage (or partial coverage) of the wireless network. The network nodes connect through interconnecting network 125, which refers to any interconnecting system capable of transmitting audio, video, signals, data, messages, or any combination of the preceding. Each network node 120 may have a single transmitter or multiple transmitters for transmitting signals 140 to wireless devices 110. In some embodiments, network node 120 may comprise a multi-input multi-output (MIMO) system. Similarly, each wireless device 110 may have a single receiver or multiple receivers for receiving signals 140 from network nodes 120.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 5A below. Similarly, a network node may include any suitable combination of hardware and/or software. For example, in particular embodiments, a network node, such as network node 120, may include the components described with respect to FIG. 6A below.

Figure 2:
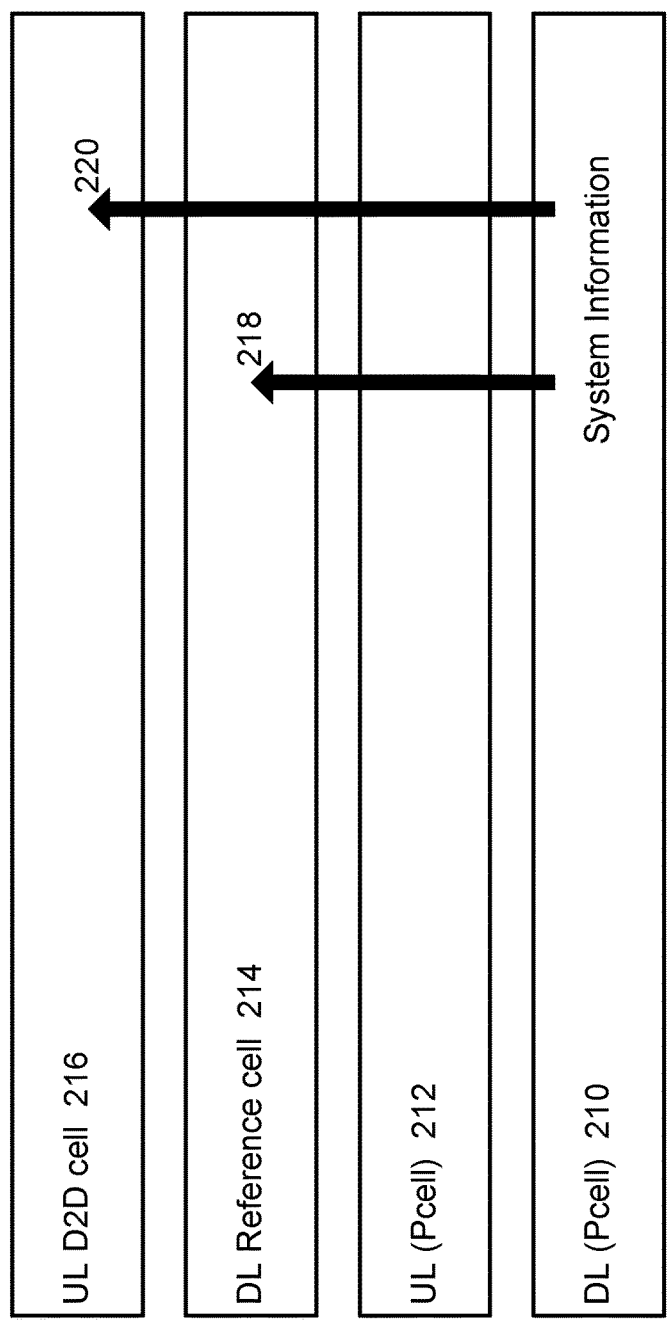
FIG. 2 is a block diagram illustrating an example of signaling resources for downlink measurements for assisting D2D operation, according to particular embodiment.

FIG. 2 is a block diagram illustrating an example of signaling resources for downlink measurements for assisting D2D operation, according to particular embodiments. A primary cell includes downlink 210 and uplink 212. The primary cell may broadcast system information 218 and 220 in its downlink 210. A wireless device, such as wireless device 110, measures downlink reference signals from downlink reference cell 214. A wireless device, such a wireless device 110a, may use uplink D2D cell 216 to communicate with another wireless device, such as wireless device 110b.

In particular embodiments, broadcast system information on a primary cell may provide an indication of a downlink reference cell or carrier to be used for downlink signal measurements (e.g., path loss) useful for uplink power control (e.g., open loop PC) and/or configuration parameters for performing measurements on such carrier. For example, wireless device 110a may receive system information 218 broadcast on primary cell downlink 210. System information 218 may instruct wireless device 110a to measure downlink reference signals transmitted on primary cell downlink 210. Wireless device 110a may use the measurements to determine transmission properties for uplink communication. For example, wireless device 110a may use the measurements for communicating on primary uplink 212, for D2D communications with wireless device 110b on uplink D2D cell 216, or for both.

In some embodiments, a set of pre-defined rules facilitates a wireless device determining a downlink reference cell or carrier to be used for downlink signal measurements used for UL power control. The pre-defined rules may be based on, for example, a frequency relation between carriers of uplink D2D cell 216 and downlink reference cell 214.

Particular embodiments include methods in a network node. Other embodiments include methods in a D2D wireless device. Example methods may include: a method in a wireless device of determining a downlink reference cell (or downlink reference signal) based on explicit indication; a method in a wireless device of determining a downlink reference cell based on pre-defined rules; a method in a wireless device of enhancing performance under an unreliable downlink reference cell; and a method in a network node of adapting D2D operation based on reliability level and availability of a downlink reference cell.

In particular embodiments, a D2D wireless device may be configured by a network node for D2D operation (e.g., D2D signal transmission and/or reception) on an uplink carrier that is not the primary cell uplink. Such an uplink carrier (i.e., UL cell, UL carrier frequency, UL frequency, etc.) used for D2D operation may be referred to as an uplink D2D carrier or a D2D dedicated carrier. In particular embodiments, a D2D wireless device may be configured with a plurality of uplink D2D carriers.

In particular embodiments, a D2D wireless device may be in any of an RRC IDLE state, an RRC connected state, or switching between these two states. In RRC connected state, the D2D wireless device may operate in single carrier or in carrier aggregation modes. In particular embodiments, the D2D transmission and/or reception may be performed by RRC IDLE wireless devices. In idle state, the wireless device may not support carrier aggregation. Traditional carrier aggregation configuration of an uplink carrier required configuration of an associated downlink carrier. In carrier aggregation, the mapping from downlink carrier to uplink carrier may be indicated to the wireless device via higher layer signaling (e.g., over SIB1 signaling (broadcast system information)). This signaling facilitates the wireless device determining which uplink carrier is to be used for the associated downlink transmission. The D2D operational scenarios described above may be referred to as asymmetrical carrier configuration, asymmetrical D2D carrier configuration, or orthogonal WAN and D2D carrier configuration or operations.

In particular embodiments, D2D wireless device operation in the uplink spectrum is a function of some downlink measurements of signals transmitted by the network (e.g., by the eNB). Examples of such measurements may include, without limitation, tracking of reference signals (RS) or pilot signals (e.g., synchronization signals, cell specific RS, etc.) transmitted by the network node (e.g., eNB) for alignment of the UE transmit timing and uplink carrier frequency.

Additional examples of downlink measurements include measurements of signal strength such as RSRP or similar power or path loss measurements that may be used for adjusting the wireless device transmit power, according to a pre-defined power control mechanism (e.g., open loop (OL) power control mechanism). As a particular example, transmit power may be adjusted based on path loss with respect to a downlink measurement. Such downlink measurements may be performed on a CRS or any other reference signal transmitted in the downlink of a cell. Such a downlink cell operating on a certain downlink carrier (in FDD) or simply a carrier (in TDD) may be referred to as a downlink reference cell or reference carrier. In another example, a wireless device monitors (broadcast) system information transmitted in the downlink by the downlink reference cell (e.g., using MIB or SIB signaling). Such downlink measurements may be combined in any way to define the coverage state of the wireless device and the associated wireless device behavior. For example, UEs that are in-coverage may have different procedures for synchronization and resource allocation as compared to UEs that are out-of-coverage.

In particular embodiments, wireless devices may monitor downlink signals on the PCell for normal IDLE operation. In IDLE mode operation, the wireless device may monitor and measure neighbor cells on the carrier of the PCell for cell reselection. Also in IDLE mode, the wireless device may be configured by the PCell to monitor and measure neighbor cells on one or more non-serving carriers (e.g., inter-frequency and/or inter-RAT carriers) for cell reselection. Traditionally, however, when a wireless device is configured to transmit on an uplink carrier that is not the PCell, it is unclear which downlink measurements should be used. In particular embodiments, the terms band and carrier may be used interchangeably and the LTE specifications often refer to carriers as "cells". Particular embodiments comprise rules and procedures for associating suitable downlink measurements useful for D2D operation on a carrier other than the PCell. Depending on the type of measurement, different carriers may be more suitable for particular measurements.

In particular embodiments, a D2D wireless device operating in asymmetrical carrier configuration may determine a downlink reference cell for an uplink D2D cell on which the D2D operation is configured. The D2D wireless device may use this determined information for performing one or more downlink measurements on the determined downlink reference cell, and may further use the performed downlink measurements for at least the D2D operation on the uplink D2D cell. A D2D wireless device configured with more than one uplink D2D cell may perform particular steps for D2D operation on each of the uplink D2D cells. The following sections describe these methods in more detail.

Figure 3:
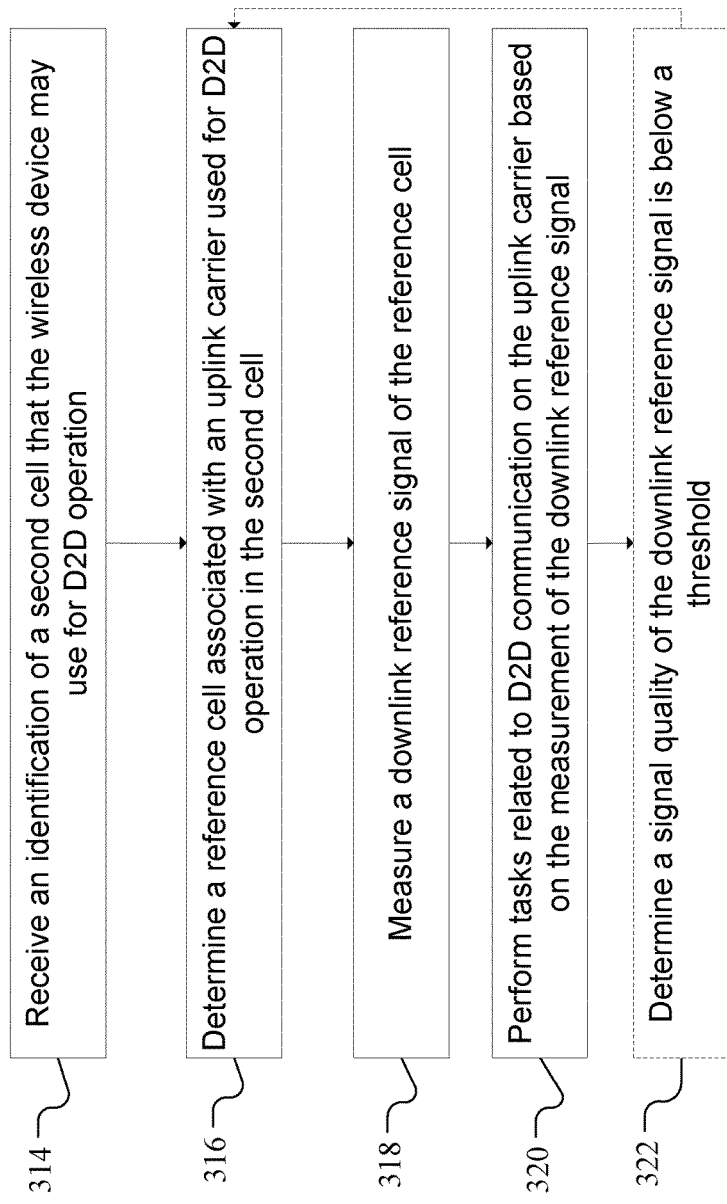
FIG. 3 is a flow diagram of a method in a wireless device of determining a downlink reference cell for D2D operation, according to particular embodiments.

FIG. 3 is a flow diagram of a method in a wireless device of determining a downlink reference cell for D2D operation, according to particular embodiments. In particular embodiments, one or more steps of method 300 may be performed by components of wireless network 100 described with reference to FIGS. 1-6.

A wireless device may be configured to use a first cell for wireless access network (WAN) operation. For example, wireless node 115a may use network node 120a as the network node of its primary cell. In particular embodiments, wireless node 115a may receive Primary Synchronization Signals (PSS) and Secondary Synchronization Signals (SSS) and use them to complete time and frequency synchronization and to acquire useful system parameters such as cell identity, cyclic prefix length, and access mode (e.g., FDD/TDD).

The method begins at step 314 where the wireless device receives an identification of a second cell that the wireless device may use for D2D operation. For example, wireless device 115a and wireless device 115b may participate in a D2D neighbor discovery to determine which cell (and which resources of the cell) to use for communication. In particular embodiments, wireless devices 115a and 115b may determine to use the uplink of cells served by any one of network nodes 120a, 120b, 120c, or any other suitable uplink carrier. In particular embodiments, the wireless device may receive any suitable communications from the network node or another wireless device for the wireless device to determine what cell to use for D2D uplink communication.

At step 316, the wireless device determines a reference cell associated with an uplink carrier used for D2D operation in the second cell. For example, wireless device 110a may determine to use the cell served by network node 120a as the reference cell and use measurements on a reference signal of the reference cell to estimate properties of the uplink carrier, such as wireless signal 150.

In particular embodiments, information about a downlink reference cell or reference carrier which a wireless device should use for performing downlink measurements for D2D operation on an uplink D2D carrier or cell may be explicitly signaled to the wireless device by the network node. The information may include a measurement rate or a measurement cycle according to which the wireless device may perform one or more downlink measurements on the indicated downlink reference cell. The network node signaling the information about the downlink reference cell or carrier may determine the information based on one or more criteria or condition, as described below.

For example, a particular embodiment comprises performing at least one measurement on the PCell downlink carrier and using such measurements to adjust the D2D operation on an uplink carrier that is not the PCell.

A particular embodiment comprises performing at least one measurement on the downlink band associated with the uplink band used for D2D transmission and using such measurements to adjust the D2D operation on the uplink band. In particular embodiments, a UE may perform measurements on the downlink carrier associated with the uplink carrier used for D2D because such carriers are close in frequency and may experience similar radio parameters or radio conditions.

At step 318, the wireless device measures at least one property of a downlink reference signal of the reference cell. For example, after acquiring the information about the downlink reference cell or carrier at step 316, in particular embodiments, the wireless device may perform one or more downlink radio measurements on that cell for D2D operation on the uplink cell (e.g., measure CRS or any other suitable reference signal).

In particular embodiments, a wireless device that reads downlink signals for D2D operation on a carrier that is not a PCell may perform such measurements in a way that does not affect the legacy behavior of wireless devices and network nodes. A particular embodiment defines a measurement cycle during which the wireless device is not expected to read at least some of the legacy downlink signals (e.g., PDCCH, PDSCH). During the measurement cycle, the wireless device may instead read downlink signals that are used for D2D operation.

In particular embodiments, information useful for downlink measurements needed for D2D may be provided in the broadcast control information on the master information block (MIB), system information block (SIB), or similar channels. Such information may be broadcasted on the PCell.

In an RRC connected state, the information may be signaled to the wireless device via its serving cell (i.e., cell used for WAN operation). Examples of such information may include the carrier frequency information such as ARFCN of the downlink carrier (e.g., EARFCN in LTE), cell ID (e.g., PCI, CGI, etc.), any non-limiting combination of the bandwidth of the downlink carrier to be used for downlink measurement, the reference signal configuration, the MBMS configuration (i.e., subframes configured for MBMS in that cell), frequency band, the association between uplink and downlink carriers, measurement cycle, the resources to be used for performing measurements, power control-related parameters such as CRS transmit power in the downlink reference cell, etc.

In particular embodiments, the measurement cycle (i.e., SCell measurement cycle or more specifically the RRC parameter measCycleSCell) may be configured for measuring reference signals (e.g., RSRP/RSRQ) on cells of SCC with deactivated SCell. measCycleSCell may be any of 160, 256, 320, 640 or 1280 ms. A wireless device may determine when to measure, but typically a wireless device measures a cell on SCC once every measurement cycle. The measurements on SCC with deactivated SCell are therefore done over much longer time and as a function of measCycleSCell. In particular embodiments, a parameter similar to measCycleSCell may be defined for D2D operation when D2D is on an uplink carrier without a downlink carrier.

In particular embodiments, the above control information may be specific for some D2D procedures/services (e.g., communication, discovery, synchronization, power control, etc.) or may be common for all D2D operations by a certain wireless device.

In particular embodiments, the signaling of control information useful for downlink measurements and the associated wireless device behavior may be different for IDLE and RRC Connected wireless devices and depending on whether a wireless device is performing carrier aggregation. For example, if a wireless device is performing carrier aggregation and if a downlink carrier associated to the D2D carrier is part of the configuration and it is also activated, then the UE may use such carrier for downlink measurements needed for D2D, disregarding the measurement behavior signaled on the PCell system information.

At step 320, the wireless device performs tasks related to D2D communication on the uplink carrier in the second cell based on the measurement of the downlink reference signal. For example, wireless device 110a performs D2D communication with wireless device 110b over wireless signal 150. Wireless device 110a transmits wireless signal 150 based on measurements from step 318. Tasks related to D2D communications may refer to data communication, discovery, synchronization, power control, or any other communication directly (i.e., not involving a network node) between two wireless devices.

Previous step 316 described embodiments where the network node signaled information about a reference cell to the wireless device. In other embodiments, the wireless device may autonomously determine which reference cell to use based on pre-defined rules. For example, step 316 may include any of the following embodiments.

In particular embodiments, a wireless device obtains, acquires, or determines information related to a DL reference cell or carrier to be used for downlink radio measurements for D2D operation on an uplink D2D cell or carrier based on one or more pre-defined rules. Upon obtaining the information, the wireless device may perform one or more DL measurements on the determined DL cell (e.g., step 318) and use it for one or more D2D related purposes (e.g., step 320).

In particular embodiments, if an uplink D2D cell or carrier is used for D2D without a corresponding downlink reference cell or carrier and the carrier of the PCell belongs to the same frequency band as the uplink D2D cell, then the wireless device may use the PCell for performing downlink measurements for D2D operation (e.g., PL, RSRP, etc.).

In particular embodiments, if an uplink D2D cell or carrier is used for D2D without a corresponding downlink reference cell or carrier and the UE is configured with a PCell but also with one or more SCells in an RRC Connected state, then the UE may use any of the PCell and SCells that belong to the same band as the uplink D2D cell for performing downlink measurements for D2D operation.

In particular embodiments, if an uplink D2D cell or carrier used is for D2D without a corresponding downlink reference cell or carrier and the carriers of the PCell are within certain frequency range (e.g., within 100 MHz) of the D2D Cell, then the wireless device may use the PCell for performing downlink measurements for D2D operation (e.g. PL, RSRP, etc.).

In particular embodiments, if an uplink D2D cell or carrier is used for D2D without a corresponding downlink reference cell or carrier and the wireless device is configured with a PCell but also with one or more SCells in an RRC Connected state, then the wireless device may use any of the PCell and SCells whose frequency and the frequency of uplink D2D cell are within a certain range (e.g., 100 MHz) for performing downlink measurements for D2D operation.

In particular embodiments, a wireless device may use a PCell or a specific SCell (in case of SCell) for downlink measurements for D2D operation on an uplink D2D cell, but the wireless device may apply an offset to the downlink measurements before using it for purposes related to D2D operation. For example, the wireless device may apply X dB of offset (e.g., 3 dB) on a path loss derived from downlink measurement on a PCell before using the derived path loss for uplink power control on an uplink D2D cell. The values of the offset may be pre-defined for each pair of bands used for PCell and/or SCells, and for an uplink D2D cell (e.g., 6 dB for PCell on E-UTRA band 1 (2 GHz) and uplink D2D cell in E-UTRA band 8). In particular embodiments, the value of the offset may also be signaled to the wireless device.

In particular embodiments, it may be pre-defined that by default the wireless device may use signaled information about a reference cell or a downlink carrier to be used for downlink measurements; but if no such information is provided, then the wireless device uses any of the pre-defined rules described herein.

The remaining steps of method 300 include steps for enhancing performance where the downlink reference cell is unreliable for performing downlink measurements. In particular embodiments, network node (e.g., eNB) transmission parameters, such as transmit power, bandwidth, frequency band and radio properties (e.g., multipath delay profile, fading condition, shadow fading, etc.), may be different for different carriers. The downlink coverage on a carrier that is not a PCell may be different than the one on the PCell. Thus, when the network node (e.g., eNB) configures a wireless device (e.g., UE) to perform downlink measurements on a different carrier than the PCell, the wireless device may not be able to perform tasks such as downlink radio measurements for D2D operation with sufficient reliability.

At optional step 322, the wireless device determines a signal quality of the downlink reference signal is below a threshold. For example, wireless device 110a may determine the path loss derived from a downlink reference signal from network node 120A is below a threshold. Under low SINR, the path loss derived from downlink reference cell for D2D operation on an uplink D2D cell may lead to the determination of inappropriate uplink transmit power (e.g., UE transmit power may be higher than a threshold causing higher uplink interference).

In particular embodiments, a wireless device may perform certain behaviors when the wireless device loses coverage (according to some downlink measurement or any downlink performance criterion) or coverage is severely degraded on the downlink carrier associated with the D2D carrier, but not on the downlink PCell. In particular embodiments, the criteria to determine coverage may be based on a signal measurement level on a downlink reference cell (e.g., RSRP level, RSRQ, SINR or SNR, etc.). For example, if SINR is below −3 dB or RSRP is below −95 dBm, then the downlink reference cell may be considered to be unreliable. Another example criterion is if the downlink cell cannot be reliably detected within a certain time. A cell may be considered to be reliably detected if the wireless device can accurately acquire its cell ID (e.g., physical cell ID) by correlating the cell's synchronization signals (e.g., PSS/SSS).

In particular embodiments, the criteria and their respective signal thresholds for determining the downlink coverage of the downlink reference cell may be pre-defined and/or the UE may be configured by the network node. The indications about the wireless device behavior to be taken in case of loss of downlink coverage on some carrier may be pre-defined and/or configured by the network node (e.g. eNB) in broadcast signaling or in wireless device (e.g., UE) specific signaling using RRC messages.

Particular examples of wireless device behavior when loss or degradation on the downlink carrier for D2D is detected are as follows. In particular embodiments, the wireless device may disable power control (e.g., OL PC) if the downlink carrier associated with the uplink D2D cell or carrier cannot be reliably detected or if its signal measurement, such as received power or signal strength (e.g., RSRP), and/or signal quality, such SINR, are below their respective thresholds.

In particular embodiments, the wireless device may perform downlink measurements for D2D communications on the downlink PCell (instead of the downlink carrier associated to the uplink D2D cell or carrier) if the downlink carrier associated with the uplink D2D cell cannot be reliably detected or signal measurement such as received power or signal strength (e.g., RSRP) and/or signal quality such SINR are below their respective thresholds.

In particular embodiments, the wireless device may use a particular resource allocation mode when the downlink reference cell is unreliably detected or not detected at all (e.g., mode 2).

In particular embodiments, the wireless device may autonomously switch the resource allocation mode, which may lead to lower transmit power when the downlink reference cell is unreliably detected or not detected at all (e.g., switch to mode 2).

In particular embodiments, if coverage of the downlink reference cell is re-established on the downlink carrier associated with the uplink D2D cell, the wireless device may switch back to the default behavior and perform measurements on the downlink carrier associated to the uplink D2D cell and use them for D2D operation.

In particular embodiments, the method may return to step 316, where the wireless device determines a new reference cell. For example, if a UE performs D2D operation according to one or more UE behaviors, then the UE may inform the network node and/or other D2D UEs which of the behaviors has been used for D2D operation. The UE may indicate that it has adopted one or more of the above UE behaviors. The network node, for example, may use this information for adapting operation of such D2D UE as described in more detail with respect to FIG. 4.

Modifications, additions, or omissions may be made to method 300. Additionally, one or more steps in method 300 of FIG. 3 may be performed in parallel or in any suitable order.

Figure 4:
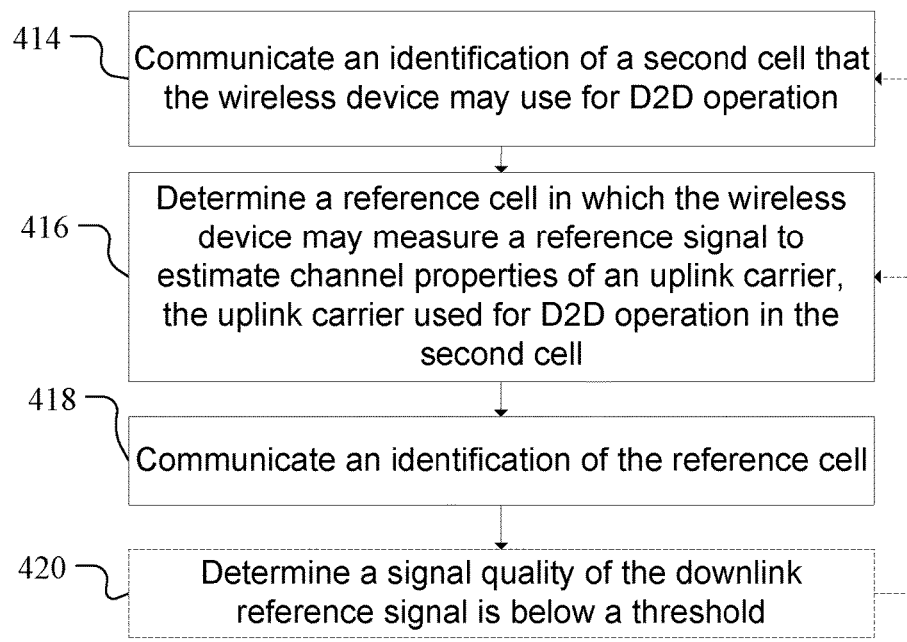
FIG. 4 is a flow diagram of a method in a network node of determining a downlink reference cell for D2D operation, according to particular embodiments.

FIG. 4 is a flow diagram of a method in a network node of determining a downlink reference cell for D2D operation, according to particular embodiments. In particular embodiments, one or more steps of method 400 may be performed by components of wireless network 100 described with reference to FIGS. 1-6.

A wireless device may be configured to use a first cell for wireless access network operation. For example, network node 120 may broadcast PSS and SSS signals that are received by wireless device 110. Wireless device 110 may use the PSS and SSS to complete time and frequency synchronization and to acquire useful system parameters such as cell identity, cyclic prefix length, and access mode (e.g., FDD/TDD). Wireless device 110 may determine to use network node 120 as the network node of its primary serving cell. In particular embodiments, the network node may communicate to the wireless device any suitable communication for the wireless device to determine what cell to use for wireless network access.

The method begins at step 414 where the network node communicates an identification of a second cell that the wireless device may use for D2D operation. For example, network node 120a may communicate to wireless device 110a that wireless device 110a should use an uplink signal associated with network node 120b for D2D communications with wireless device 110b.

At step 416, the network node determines a reference cell associated with the uplink carrier used for D2D operation in the second cell. For example, network node 120a may determine that wireless device 110a should use the cell served by network node 120a as the reference cell to estimate channel properties of the uplink signal used for D2D communications with wireless device 110b.

In particular embodiments, the network node may use any of the rules described with respect to the wireless device in method 300 of FIG. 3. For example, the network node may evaluate the rules described in method 300 and signal the results to the wireless device.

At step 418, the network node communicates an identification of the reference cell to the wireless device. For example, network node 120a may communicate to wireless device 110a an instruction to use the reference cell determined in step 414 to estimate channel properties of the uplink signal used for D2D communications with wireless device 110b.

Particular steps of method 400 facilitate the network node adapting D2D operation based on a reliability level and availability of a downlink reference cell. In particular embodiments, a network node (e.g., serving eNodeB of the UE) may adapt or change an uplink cell or carrier on which D2D operation is configured when the corresponding downlink reference cell selected by the network node cannot be sufficiently reliability detected by the D2D wireless device for downlink measurements.

At optional step 420, the network node determines a signal quality of the downlink reference signal is below a threshold. For example, network node 120 may receive an indication from wireless device 110 that the path loss of the received CRS is too high.

In particular embodiments, the network node may adapt or change the uplink cell or carrier on which the D2D operation is configured if the network node cannot determine a suitable downlink reference for that D2D wireless device. For example, the downlink reference cell may not be considered suitable for a D2D wireless device using a certain uplink D2D cell if the potential downlink reference and uplink D2D cells are operated by different network nodes. This may be because the downlink cell measurement may not be sufficiently accurate when the wireless device is far from the downlink cell's network node.

In particular embodiments, a network node may consider a downlink reference cell as a suitable cell for a certain uplink D2D cell if both the downlink reference cell and the uplink D2D cells are in the same network node and they also belong to the same frequency band.

In particular embodiments, if a network node is unable to find a suitable downlink reference cell for WAN and D2D operations on orthogonal (i.e., different) carriers, then the network node may configure the wireless device on an uplink serving cell (e.g., UL PCell). The network node may configure the wireless device in an idle state to change its state from idle to connected state to more easily configure the wireless device for D2D operation on an uplink PCell. In particular embodiments where the wireless device changes RRC state for D2D operation, the network node may configure the wireless device in a connected state with a long DRX cycle (e.g., 1280 ms) to preserve wireless device battery power.

Upon determining a new uplink serving cell, the method may continue to step 414 where the network node communicates an identification of a new uplink cell for D2D operation. In particular embodiments, the network node may determine a new reference cell or downlink reference signal. In such embodiments, the method may continue to step 416 where the network node communicates the identification of the new reference cell or downlink reference signal to the wireless device.

Modifications, additions, or omissions may be made to method 400. Additionally, one or more steps in method 400 of FIG. 4 may be performed in parallel or in any suitable order.

Figure 5A:
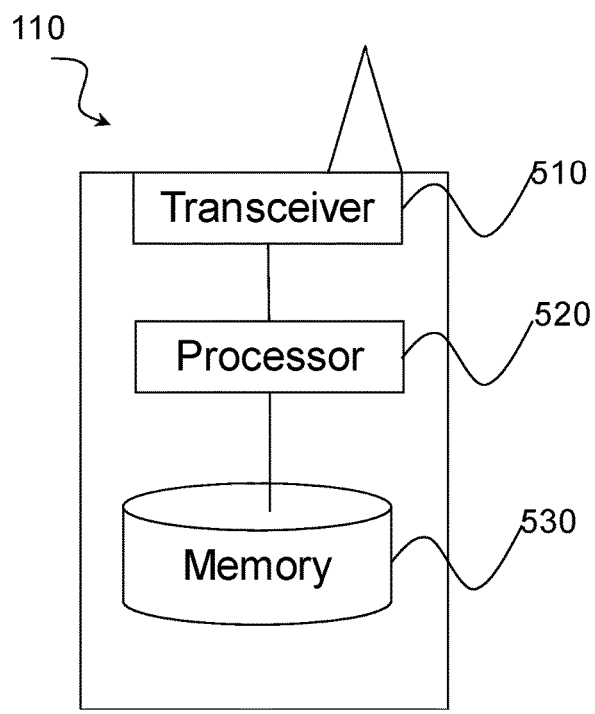
FIG. 5A is a block diagram illustrating an example embodiment of a wireless device.

FIG. 5A is a block diagram illustrating an example embodiment of a wireless device. The wireless device is an example of the wireless devices 110 illustrated in FIG. 1. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 510, processor 520, and memory 530. In some embodiments, transceiver 510 facilitates transmitting wireless signals to and receiving wireless signals from wireless network node 120 (e.g., via an antenna), processor 520 executes instructions to provide some or all of the functionality described herein as provided by the wireless device, and memory 530 stores the instructions executed by processor 520.

Processor 520 includes any suitable combination of hardware and software implemented in one or more integrated circuits or modules to execute instructions and manipulate data to perform some or all of the described functions of the wireless device. In some embodiments, processor 520 may include, for example, one or more computers, one more programmable logic devices, one or more central processing units (CPUs), one or more microprocessors, one or more applications, and/or other logic, and/or any suitable combination of the preceding. Processor 520 may include analog and/or digital circuitry configured to perform some or all of the described functions of wireless device 110. For example, processor 520 may include resistors, capacitors, inductors, transistors, diodes, and/or any other suitable circuit components.

Memory 530 is generally operable to store computer executable code and data. Examples of memory 530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 520 in communication with transceiver 510 reference signals from radio network node 120. Other embodiments of the wireless device may include additional components (beyond those shown in FIG. 5A) responsible for providing certain aspects of the wireless device's functionality, including any of the functionality described above and/or any additional functionality (including any functionality necessary to support the solution described above).

Figure 5B:
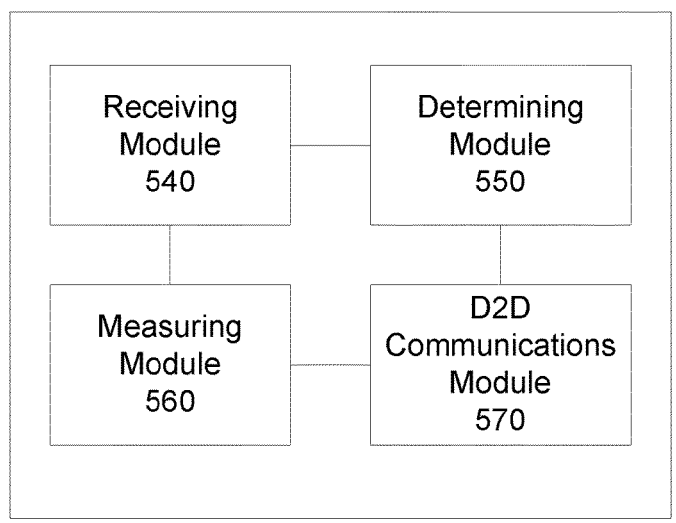
FIG. 5B is a block diagram illustrating example components of a wireless communication device.

FIG. 5B is a block diagram illustrating example components of a wireless communication device 110. The components may include a receiving module 540, a determining module 550, a measuring module 560, and a D2D communications module 570. Receiving module 540 may perform the receiving functions of wireless device 110. For example, receiving module 540 may receive information about a downlink reference signal or reference cell from network node 120 of network 100. As another example, receiving module 540 may receive messages from network node 110 of network 100. In certain embodiments, receiving module 540 may include or be included in radio 510. Receiving module 540 may include a receiver and/or a transceiver. Receiving module 540 may include circuitry configured to wirelessly receive messages and/or signals. In particular embodiments, receiving module 540 may communicate received messages and/or signals to determining module 550.

Determining module 550 may perform the processing functions of wireless device 110 related to determining a downlink reference signal or reference cell that wireless device 110 may measure to estimate channel properties of an uplink carrier, the uplink carrier used for D2D operation in a second cell. In certain embodiments, determining module 550 may include or be included in processor 520. Determining module 550 may include analog and/or digital circuitry configured to perform any of the functions of determining module 550 and/or processor 520.

Measuring module 560 may perform measuring functions of wireless device 110 for measuring a downlink reference signal. In certain embodiments, measuring module 560 may include or be included in processor 520. Measuring module 560 may include analog and/or digital circuitry configured to perform any of the functions of measuring module 560 and/or processor 520. In particular embodiments, measuring module 560 may receive information about a reference signal or reference cell from receiving module 540. In particular embodiments, measuring module 560 may communicate measurements to D2D communications module 570.

D2D communications module 570 may perform the D2D functions of wireless device 110 for communicating with another wireless device 110. In certain embodiments, D2D communications module 570 may include or be included in processor 520. D2D communications module 570 may include analog and/or digital circuitry configured to perform any of the functions of D2D communications module 570 and/or processor 520. In particular embodiments, D2D communications module 570 may perform D2D communication on the uplink carrier such as data communication, discovery, synchronization, and power control. In particular embodiments, D2D communications module 570 may receive information about an uplink carrier from measuring module 560.

Figure 6A:
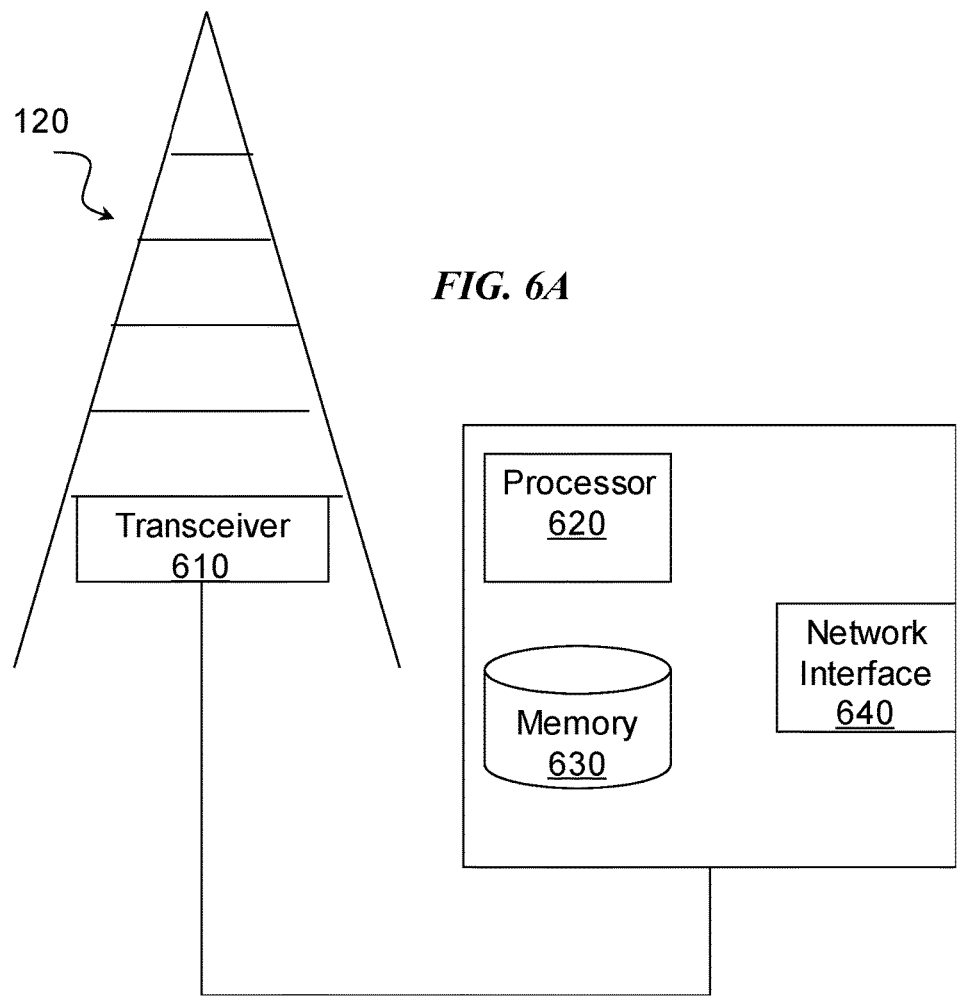
FIG. 6A is a block diagram illustrating an example embodiment of a network node.

FIG. 6A is a block diagram illustrating an example embodiment of a network node. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 610, at least one processor 620, at least one memory 630, and at least one network interface 640. Transceiver 610 facilitates transmitting wireless signals to and receiving wireless signals from a wireless device, such as wireless devices 110 (e.g., via an antenna); processor 620 executes instructions to provide some or all of the functionality described above as being provided by a network node 120; memory 630 stores the instructions executed by processor 620; and network interface 640 communicates signals to backend network components, such as a gateway, switch, router, Internet, Public Switched Telephone Network (PSTN), controller, and/or other network nodes 120. Processor 620 and memory 630 can be of the same types as described with respect to processor 520 and memory 530 of FIG. 5A above.

In some embodiments, network interface 640 is communicatively coupled to processor 620 and refers to any suitable device operable to receive input for network node 120, send output from network node 120, perform suitable processing of the input or output or both, communicate to other devices, or any combination of the preceding. Network interface 640 includes appropriate hardware (e.g., port, modem, network interface card, etc.) and software, including protocol conversion and data processing capabilities, to communicate through a network.

In particular embodiments, processor 620 in communication with transceiver 610 transmits, to wireless device 110, reference signals. In particular embodiments, processor 620 in communication with transceiver 610 transmits reference signals as described above to wireless device 110.

Other embodiments of network node 120 include additional components (beyond those shown in FIG. 6A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 6B:
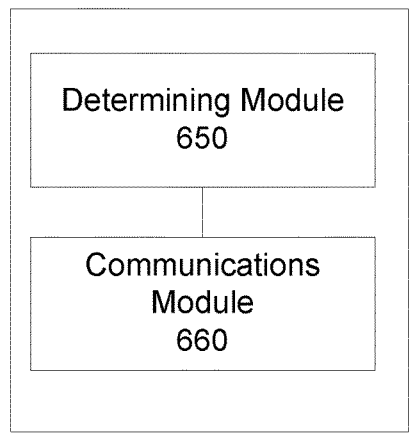
FIG. 6B is a block diagram illustrating example of components of a network node.

FIG. 6B is a block diagram illustrating example components of a network node 120. The components may include a determining module 650 and a communications module 660. Determining module 650 may perform the processing functions of network node 120 related to determining a downlink reference signal or reference cell that wireless device 110 may measure to estimate channel properties of an uplink carrier, the uplink carrier used for D2D operation in a second cell. In certain embodiments, determining module 650 may include or be included in processor 620. Determining module 650 may include analog and/or digital circuitry configured to perform any of the functions of determining module 650 and/or processor 620. In particular embodiments, determining module 650 may communicate information about a reference signal or reference cell to communications module 660.

Communications module 660 may perform the processing functions of network node 120 related to communicating information to wireless device 110. In particular embodiments, communications module 660 may communicate, to wireless device 110, an identification of a cell that the wireless device may use for WAN operation, an identification of a cell that the wireless device may use for D2D operation, an identification of a downlink reference signal or reference cell, or any suitable combination of information used for D2D operation. In certain embodiments, communications module 660 may include or be included in processor 620. Communications module 660 may include analog and/or digital circuitry configured to perform any of the functions of communications module 660 and/or processor 620.

Some embodiments of the disclosure may provide one or more technical advantages. As an example, in some embodiments, rules and procedures enable a D2D UE to perform one or more downlink signal measurements (e.g., path loss) for D2D related operations (e.g., UL power control on D2D carrier) when the D2D operation is performed on a carrier frequency that is different than the carrier of any of the serving cells of the UE for WAN operation (e.g., neither PCell nor SCell).

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BS Base Station
BSC Base Station Controller
BTS Base Transceiver Station
CA Carrier Aggregation
CC Component Carrier
CGI Cell Global Identity
CRS Cell-specific Reference Signal
D2D Device-to-Device
DL Downlink
EARFCN Evolved Absolute Radio Frequency Channel Number
ECGI Evolved CGI
eNB eNodeB
FDD Frequency Division Duplex
HD-FDD Half Duplex FDD
HO Handover
LTE Long Term Evolution
M2M Machine to Machine
MAC Media Access Control
MeNB Master eNodeB
MIB Master Information Block
NSPS National Security and Public Safety
OL Open Loop
PC Power Control
PCC Primary Component Carrier
PCI Physical Cell Identity
PCell Primary Cell
PSCell Primary SCell
PSC Primary Serving Cell
PSS Primary Synchronization Signal
ProSe Proximity-based Services
PUCCH Physical Uplink Control Channel
PUSCH Physical Uplink Shared Channel
RAN Radio Access Network
RAT Radio Access Technology
RRC Radio Resource Control
RRH Remote Radio Head
RRU Remote Radio Unit
RSRP Reference Signal Received Power
RSRQ Reference Signal Received Quality
RSSI Received Signal Strength Indication
SA Scheduling Assignment
SCC Secondary Component Carrier
SCell Secondary Cell
SeNB Secondary eNodeB
SFN System Frame Number
SI System Information
SIB System Information Block
SIB1 System Information Block Type 1
SINR Signal to Interference and Noise Ratio
SSC Secondary Serving Cell
SSS Secondary Synchronization Signal
TDD Time Division Duplex
UE User Equipment
UL Uplink
WAN Wireless Access Network

The invention claimed is:

1. A method in a wireless device configured to use a first cell for wireless access network (WAN) operation, the method comprising:
receiving, from the network node, an identification of a second cell that the wireless device may use for device-to-device (D2D) operation;
determining, a reference cell associated with an uplink carrier used for D2D operation in the second cell, wherein determining the reference cell comprises determining an identification of the reference cell based on a pre-defined rule;
measuring a downlink reference signal of the reference cell; and
performing one or more tasks related to D2D communication on the uplink carrier based on the measurement of the downlink reference signal.

2. The method of claim 1, wherein determining the reference cell comprises receiving, from the network node, an identification of the reference cell.

3. The method of claim 2, wherein the identification of the reference cell comprises an identification of one of the first cell and the second cell.

4. The method of claim 1, wherein determining the identification of the reference cell based on the pre-defined rule comprises:
determining the second cell does not include a downlink reference signal;
determining a carrier of the first cell belongs to the same frequency band as the uplink carrier used for D2D operation in the second cell; and
identifying the first cell.

5. The method of claim 1, wherein determining the identification of the reference cell based on the pre-defined rule comprises:
determining the second cell does not include a downlink reference signal;
determining the first cell comprises a carrier aggregation primary cell;
determining the wireless device is associated with a third cell, the third cell comprising a carrier aggregation secondary cell;
determining that a carrier of one of the first cell or the second cell belongs to the same frequency band as the uplink carrier used for D2D operation in the second cell; and
identifying the second cell.

6. The method of claim 4, wherein determining that a carrier belongs to the same frequency band as the uplink carrier used for D2D operation in the second cell comprises determining the carrier belongs to a frequency band within a pre-defined range of the frequency band of the uplink carrier used for D2D operation in the second cell.

7. The method of claim 1, further comprising applying an offset to the measurement of the downlink reference signal.

8. The method of claim 7, further comprising receiving the offset from the network node.

9. The method of claim 7, further comprising determining the offset based on a pre-defined rule.

10. The method of claim 1, further comprising determining a signal quality of the downlink reference signal is below a threshold.

11. The method of claim 10, further comprising disabling power control on the uplink carrier used for D2D operation in the second cell.

12. The method of claim 10, further comprising modifying a resource allocation mode for the uplink carrier used for D2D operation in the second cell.

13. The method of claim 10, further comprising determining another downlink reference signal associated with the uplink carrier used for D2D operation in the second cell.

14. A method in a network node, the method comprising:
communicating, to a wireless device configured to use a first cell for wireless access network (WAN) operation and operable to perform device-to-device (D2D) communication, an identification of a second cell that the wireless device may use for D2D operation;

determining, a reference cell associated with an uplink carrier used for D2D operation in the second cell;

communicating, to the wireless device, an identification of the reference cell;

receiving, an indication that a signal quality of a downlink reference signal is below a threshold; and determining another downlink reference signal associated with an uplink carrier used for D2D operation in the second cell, wherein a downlink reference signal transmitted in the reference cell is measured by the wireless device.

15. The method of claim 14, wherein a task related to D2D communication on the uplink carrier is based on the measurement.

16. The method of claim 14, wherein the reference cell is one of the first cell and the second cell.

17. The method of claim 14, further comprising communicating, to the wireless device, an offset that the wireless device is to apply to a measurement on a downlink reference signal of the reference cell.

18. A wireless device configured to use a first cell for wireless access network (WAN) operation and comprising a processor operable to:

receive, from the network node, an identification of a second cell that the wireless device may use for device-to-device (D2D) operation;

determine a reference cell associated with an uplink carrier used for D2D operation in the second cell, wherein the processor operable to determine the reference cell is operable to determine an identification of the reference cell based on a pre-defined rule;

measure a downlink reference signal of the reference cell; and perform one or more tasks related to D2D communication on the uplink carrier based on the measurement of the downlink reference signal.

19. The wireless device of claim 18, wherein the processor operable to determine the reference cell is operable to receive, from the network node, an identification of the reference cell.

20. The wireless device of claim 19, wherein the identification of the reference cell comprises an identification of one of the first cell and the second cell.

21. The wireless device of claim 18, wherein the processor operable to determine the identification of the reference cell based on the pre-defined rule is operable to:

determine the second cell does not include a downlink reference signal;

determine a carrier of the first cell belongs to the same frequency band as the uplink carrier used for D2D operation in the second cell; and identify the first cell.

22. The wireless device of claim 18, wherein the processor operable to determine the identification of the reference cell based on the pre-defined rule is operable to:

determine the second cell does not include a downlink reference signal;

determine the first cell comprises a carrier aggregation primary cell;

determine the wireless device is associated with a third cell, the third cell comprising a carrier aggregation secondary cell;

determine that a carrier of one of the first cell or the second cell belongs to the same frequency band as the uplink carrier used for D2D operation in the second cell; and identify the second cell.

23. The wireless device of claim 21, wherein the processor operable to determine that a carrier belongs to the same frequency band as the uplink carrier used for D2D operation in the second cell is operable to determine the carrier belongs to a frequency band within a pre-defined range of the frequency band of the uplink carrier used for D2D operation in the second cell.

24. The wireless device of claim 18, the processor further operable to receive the offset from the network node.

25. The wireless device of claim 24, the processor further operable to receive the offset from the network node.

26. The wireless device of claim 24, the processor further operable to determine the offset based on a pre-defined rule.

27. The wireless device of claim 18, the processor further operable to determine that a signal quality of the downlink reference signal is below a threshold.

28. The wireless device of claim 18, the processor further operable to disable power control on the uplink carrier used for D2D operation in the second cell.

29. The wireless device of claim 18, the processor further operable to modify a resource allocation mode for the uplink carrier used for D2D operation in the second cell.

30. The wireless device of claim 18, the processor further operable to determine another downlink reference signal associated with the uplink carrier used for D2D operation in the second cell.

31. A network node comprising a processor operable to:

communicate, to a wireless device configured to use a first cell for wireless access network (WAN) operation and operable to perform device-to-device (D2D) communication, an identification of a second cell that the wireless device may use for D2D operation;

determine a reference cell associated with an uplink carrier used for D2D operation in the second cell;

communicate, to the wireless device, an identification of the reference cell;

receive an indication that a signal quality of a downlink reference signal is below a threshold; and determine another reference cell associated with an uplink carrier used for D2D operation in the second cell.

32. The network node of claim 31, wherein the reference cell is one of the first cell and the second cell.

33. The network node of claim 31, the processor further operable to communicate, to the wireless device, an offset that the wireless device is to apply to a measurement on a downlink reference signal of the reference cell.

* * * * *